US012128576B2

(12) United States Patent
Barrett et al.

(10) Patent No.: US 12,128,576 B2
(45) **Date of Patent: *Oct. 29, 2024**

(54) SINGLE-BLADE RAZOR APPARATUS

(71) Applicant: OneBlade, Inc., Coral Gables, FL (US)

(72) Inventors: Tod Barrett, Austin, TX (US); Frank Porter Stansberry, Cockeysville, MD (US); Mark Prommel, Brooklyn, NY (US)

(73) Assignee: OneBlade, Inc., Coral Gables, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/324,871

(22) Filed: May 26, 2023

(65) Prior Publication Data

US 2023/0302673 A1 Sep. 28, 2023

Related U.S. Application Data

(63) Continuation of application No. 17/496,618, filed on Oct. 7, 2021, now Pat. No. 11,697,216, which is a (Continued)

(51) Int. Cl.

*B26B 21/16* (2006.01)
*B26B 21/40* (2006.01)
*B26B 21/52* (2006.01)

(52) U.S. Cl.

CPC .......... *B26B 21/16* (2013.01); *B26B 21/4031* (2013.01); *B26B 21/4068* (2013.01); *B26B 21/521* (2013.01)

(58) Field of Classification Search

CPC . B26B 21/16; B26B 21/4031; B26B 21/4068; B26B 21/521; B26B 5/006; B26B 29/02

(Continued)

(56) References Cited

U.S. PATENT DOCUMENTS 1,053,089 A 2/1913 Holm
1,057,644 A 4/1913 Hiener (Continued)

FOREIGN PATENT DOCUMENTS

CN 101077425 11/2007
CN 101353768 1/2009

(Continued)

OTHER PUBLICATIONS

Invitation to Pay Additional Fees in PCT Application No. PCT/US2016/058696 mailed Feb. 22, 2017, 7 pages.

(Continued)

*Primary Examiner* — Nhat Chieu Q Do

(74) *Attorney, Agent, or Firm* — Kowert, Hood, Munyon, Rankin & Goetzel, P.C.; Gareth M. Sampson; Dean M. Munyon

(57) ABSTRACT

A single-blade razor apparatus and methods are for manufacturing the same. A razor apparatus includes a handle and a head mounted on the handle. The head includes an upper portion and a lower portion that, when coupled together, are configured to have a single blade positioned between the upper portion and the lower portion. A cutting edge of the single blade may be exposed through a front side of the head when the single blade is positioned inside the head and between the upper portion and lower portion. The head may include a plurality of retaining posts on the lower portion of the head. At least two of the retaining posts may engage with opposing edges of the single blade when the single blade is positioned inside the head to retain the single blade inside the head.

20 Claims, 8 Drawing Sheets

Related U.S. Application Data continuation of application No. 16/742,408, filed on Jan. 14, 2020, now Pat. No. 11,141,872, which is a continuation of application No. 15/333,398, filed on Oct. 25, 2016, now Pat. No. 10,538,005.

(58) Field of Classification Search
USPC .......................................... 30/32–43.3, 47–84
See application file for complete search history.

(56) References Cited

U.S. PATENT DOCUMENTS

| | | | |
|---|---|---|---|
| 1,117,953 A | 11/1914 | Crandall | |
| 1,169,395 A | 1/1916 | Greist et al. | |
| 1,200,426 A | 10/1916 | King | |
| 1,234,834 A | 7/1917 | Warren | |
| 1,460,139 A | 6/1923 | Parker | |
| 1,633,139 A | 6/1927 | Staats-oels | |
| 1,991,405 A * | 2/1935 | Merriman | B26B 21/18 30/41 |
| 2,018,304 A | 10/1935 | Hayhurst | |
| 2,019,957 A | 11/1935 | England | |
| 2,030,833 A | 2/1936 | Thompson | |
| 2,033,995 A * | 3/1936 | Nyhagen | B26B 21/18 30/70 |
| 2,077,241 A | 4/1937 | Karle | |
| 2,108,758 A | 2/1938 | Thompson et al. | |
| 2,288,302 A | 6/1942 | Reyburn et al. | |
| 2,386,536 A | 10/1945 | Bensel | |
| D143,326 S | 12/1945 | Kempf | |
| D146,759 S | 5/1947 | Brown | |
| 2,545,533 A | 3/1951 | Stewart | |
| 2,588,211 A | 3/1952 | Crowell | |
| 2,744,317 A | 5/1956 | Borden | |
| 2,780,866 A | 2/1957 | Borden | |
| 2,794,246 A | 6/1957 | Marsh et al. | |
| 3,015,159 A | 1/1962 | Baun | |
| 3,045,342 A | 7/1962 | Diehl | |
| 3,067,512 A | 12/1962 | Randol | |
| 3,078,569 A | 2/1963 | Sidney et al. | |
| 3,080,651 A | 3/1963 | Cas | |
| 3,203,093 A | 8/1965 | Kuhnl | |
| 3,488,764 A | 1/1970 | Welsh | |
| 3,583,262 A | 6/1971 | Mullen | |
| 3,605,265 A | 9/1971 | Iten | |
| 3,775,845 A | 12/1973 | Kuhnl | |
| 3,777,396 A | 12/1973 | Simonetti | |
| 3,949,470 A | 4/1976 | Hall | |
| D241,080 S | 8/1976 | Glaberson | |
| D248,878 S | 8/1978 | Halm | |
| D249,968 S | 10/1978 | Kiraly | |
| D250,130 S | 10/1978 | Douglas | |
| D250,547 S | 12/1978 | Palmer | |
| 4,152,828 A | 5/1979 | Lund | |
| D253,726 S | 12/1979 | Schuman et al. | |
| 4,180,907 A | 1/1980 | Iten | |
| 4,184,246 A | 1/1980 | Trotta | |
| 4,198,745 A | 4/1980 | Moehlenpah | |
| 4,200,976 A | 5/1980 | Gooding | |
| 4,212,103 A | 7/1980 | Schuman-Hoole | |
| D259,065 S | 4/1981 | Byrne | |
| 4,272,886 A | 6/1981 | Asano | |
| 4,275,498 A | 6/1981 | Ciaffone | |
| 4,337,575 A | 7/1982 | Trotta | |
| D268,291 S | 3/1983 | Jones | |
| 4,392,303 A | 7/1983 | Ciaffone | |
| 4,446,619 A | 5/1984 | Jacobson | |
| 4,476,630 A | 10/1984 | Byrne | |
| 4,574,476 A | 3/1986 | Ortiz | |
| 4,617,736 A | 10/1986 | McCrary | |
| D293,036 S | 12/1987 | Iten et al. | |
| 4,813,131 A | 3/1989 | Gruner | |
| 4,833,779 A | 5/1989 | Iten | |
| 4,852,254 A | 8/1989 | Duncan | |
| 4,866,844 A | 9/1989 | Burout, III | |
| D304,773 S | 11/1989 | Beuchat | |
| 4,879,811 A | 11/1989 | Cooney | |
| D310,580 S | 9/1990 | King | |
| 4,970,784 A | 11/1990 | Althaus et al. | |
| 5,012,578 A * | 5/1991 | Siefer | B26B 29/00 30/47 |
| 5,048,184 A | 9/1991 | Saxton | |
| 5,251,376 A | 10/1993 | Althaus et al. | |
| 5,251,752 A | 10/1993 | Purohit | |
| D345,232 S | 3/1994 | Gray | |
| D354,586 S | 1/1995 | Grange | |
| 5,416,974 A | 5/1995 | Wain | |
| 5,461,781 A | 10/1995 | Pirc | |
| 5,526,567 A | 6/1996 | Carson, III et al. | |
| 5,526,568 A | 6/1996 | Copelan | |
| D375,408 S | 11/1996 | Muller | |
| 5,687,485 A | 11/1997 | Shurtleff et al. | |
| 5,715,606 A * | 2/1998 | de Wolf | B26B 21/227 30/48 |
| 5,784,790 A | 7/1998 | Carson, III et al. | |
| 5,953,824 A | 9/1999 | Ferraro et al. | |
| D427,376 S | 6/2000 | Scott | |
| 6,141,875 A | 11/2000 | Andrews | |
| 6,266,888 B1 | 7/2001 | Zowaski | |
| D446,884 S | 8/2001 | Kohring et al. | |
| 6,418,623 B1 | 7/2002 | Marcarelli | |
| 6,473,971 B2 | 11/2002 | Ordaz | |
| 6,530,151 B2 | 3/2003 | Kameka | |
| D476,772 S | 7/2003 | Wonderley | |
| 6,655,029 B2 | 12/2003 | Saito | |
| 6,694,626 B2 | 2/2004 | Kludjian et al. | |
| D500,888 S | 1/2005 | Gray | |
| D508,586 S | 8/2005 | Shurtleff | |
| D512,795 S | 12/2005 | Carpenter | |
| D513,540 S | 1/2006 | Wonderley | |
| 7,028,407 B2 | 4/2006 | Ehrlich et al. | |
| 7,140,115 B2 | 11/2006 | Greene | |
| 7,155,828 B2 | 1/2007 | Guimont et al. | |
| 7,197,827 B2 | 4/2007 | Paquette | |
| D541,987 S | 5/2007 | Sugawara | |
| D542,468 S | 5/2007 | Stiles | |
| D558,396 S | 12/2007 | Sierra et al. | |
| D560,032 S | 1/2008 | Lopez | |
| D587,846 S | 3/2009 | Wonderley et al. | |
| D599,955 S | 9/2009 | Provost | |
| D603,560 S | 11/2009 | Micinilio | |
| D612,540 S | 3/2010 | Joslin | |
| D619,763 S | 7/2010 | Coresh | |
| D621,095 S | 8/2010 | Cataudella | |
| D627,929 S | 11/2010 | Haba | |
| D635,302 S | 3/2011 | Psimadas et al. | |
| D636,938 S | 4/2011 | White, Jr. et al. | |
| 7,975,389 B2 | 7/2011 | Bozikis et al. | |
| D650,527 S | 12/2011 | Andersen et al. | |
| D667,168 S | 9/2012 | Greene | |
| 8,273,205 B2 | 9/2012 | Murgida | |
| D703,377 S | 4/2014 | Christie et al. | |
| 8,720,072 B2 | 5/2014 | Bucco | |
| 8,739,411 B2 | 6/2014 | Kinghorn et al. | |
| 9,108,329 B2 | 8/2015 | Stiles | |
| 9,393,708 B2 | 7/2016 | Babaev | |
| D763,506 S | 8/2016 | Barrett | |
| 2002/0066186 A1 | 6/2002 | White et al. | |
| 2002/0116822 A1 | 8/2002 | Coffin | |
| 2004/0181954 A1 | 9/2004 | Follo et al. | |
| 2005/0000100 A1 | 1/2005 | Coffin | |
| 2007/0251106 A1 | 11/2007 | Gladstone | |
| 2010/0205808 A1 | 8/2010 | King | |
| 2011/0016724 A1 | 1/2011 | Murgida | |
| 2012/0096718 A1 | 4/2012 | Howell et al. | |
| 2012/0096723 A1 | 4/2012 | Howell et al. | |
| 2012/0233868 A1 | 9/2012 | Bridges et al. | |
| 2013/0047449 A1 | 2/2013 | Zakuskin | |
| 2013/0081291 A1 | 4/2013 | Wain et al. | |
| 2014/0101947 A1 | 4/2014 | Samuels et al. | |
| 2014/0116211 A1 | 5/2014 | Griffin et al. | |
| 2014/0230256 A1 | 8/2014 | Christie et al. | |
| 2014/0331500 A1 | 11/2014 | Ren | |

(56) References Cited

U.S. PATENT DOCUMENTS

| | | | | |
|---|---|---|---|---|
| 2015/0183119 | A1 | 7/2015 | Contaldi | |
| 2016/0144519 | A1* | 5/2016 | Hahn | B26B 21/30 30/50 |
| 2016/0288349 | A1 | 10/2016 | Barrett et al. | |

FOREIGN PATENT DOCUMENTS

| | | | | |
|---|---|---|---|---|
| CN | 203357477 | | | 12/2013 |
| DE | 8034837 | | | 12/1986 |
| FR | 2612112 | | | 9/1988 |
| JP | H05-000192 | A | | 1/1993 |
| JP | 2002235153 | A | * | 8/2002 |
| JP | 2005218565 | A | * | 8/2005 |
| WO | 95/29798 | | | 11/1995 |

OTHER PUBLICATIONS

International Search Report and Written Opinion in Application No. PCT/US2016/058696 mailed May 9, 2017, 16 pages.

Second Office Action in CN Appl. No. 201680090428.7 mailed Feb. 7, 2021, 12 pages.

Examination Report in European Appl. No. 16788402.2 mailed May 14, 2020, 4 pages.

Office Action in CN Appl. No. 201680090428.7 mailed Jul. 10, 2020, 15 pages.

Office Action in Korean Appl. No. 10-2019-7012315 mailed Apr. 19, 2024, 9 pages.

* cited by examiner

SINGLE-BLADE RAZOR APPARATUS

CROSS-REFERENCE TO RELATED APPLICATIONS

The present application is a continuation of U.S. application Ser. No. 17/496,618, entitled "SINGLE-BLADE RAZOR APPARATUS," filed Oct. 7, 2021, which is a continuation of U.S. application Ser. No. 16/742,408, entitled "SINGLE-BLADE RAZOR APPARATUS," filed Jan. 14, 2020 (now U.S. Pat. No. 11,141,872), which is a continuation of U.S. application Ser. No. 15/333,398, entitled "SINGLE-BLADE RAZOR APPARATUS," filed Oct. 25, 2016 (now U.S. Pat. No. 10,538,005); the disclosures of each of the above-referenced applications are incorporated by reference herein in their entireties.

INCORPORATION BY REFERENCE

The contents of U.S. Provisional Patent Application No. 62/060,410, filed Oct. 6, 2014 and entitled "SHAVING BLADE AND RAZOR APPARATUS," U.S. Provisional Patent Application No. 62/135,592, filed Mar. 19, 2015 and entitled "SHAVING BLADE AND RAZOR APPARATUS," U.S. Provisional Patent Application No. 62/174,067, filed Jun. 11, 2015 and entitled "SHAVING BLADE AND RAZOR APPARATUS," and U.S. patent application Ser. No. 14/875,484, filed Oct. 5, 2015 and entitled "RAZOR APPARATUS AND SHAVING SYSTEM" are incorporated by reference herein in their entireties.

BACKGROUND

Technical Field

Embodiments described herein relate to the field of shaving tools, and more particularly, to a single-blade razor and methods of manufacturing the same.

Description of the Related Art

Since the latter part of the $20^{th}$ century, the market for shaving tools has been dominated by the trend of including an ever-larger number of low-quality blades in a disposable cartridge. For example, whereas a two-blade cartridge was once considered revolutionary, currently five- and six-blade cartridges command increasing market share.

Evidence that such multi-blade cartridges actually improve shaving performance is scant, however. In fact, the present inventors have recognized a well-designed razor using a single, high quality blade can provide a shaving experience that is superior to that of multi-blade cartridges. These inventors' continuing research into the design of single-blade shaving systems has yielded additional discoveries that may further improve the quality of the single-blade shaving experience and the durability of the single-blade razor itself.

SUMMARY

Various embodiments of a razor apparatus and methods for manufacturing the same are disclosed. In an embodiment, a razor apparatus may include a handle and a head pivotably mounted on the handle. The head may include a rear side including an aperture for receiving a single blade, as well as a front side through which a cutting edge of the single blade is exposed during use. The head may further include an upper portion and a lower portion that form the aperture. The lower portion may physically interface with the upper portion so that a front region of the upper portion is physically supported by the lower portion.

In a particular implementation of the razor apparatus, to physically interface with the upper portion, the lower portion may include several protruding latches located in the area proximate the front side of the head. The protruding latches may respectively mate with a number of recesses formed in the upper portion. Alternatively, the latches may be formed in the upper portion and may respectively mate with recesses formed in the lower portion.

An embodiment of a method of manufacturing a razor apparatus may include fabricating a lower portion and an upper portion of a head of the razor apparatus, where the lower portion and the upper portion are fabricated to physically interface with each other, when assembled, at a front region and a rear region of the head. The method may further include assembling the lower portion and the upper portion of the head. When assembled, the lower and upper portions of the head may engage so that at the front region of the head, the upper portion is physically supported by the lower portion. Upon assembly, the lower and upper portions of the head may form an aperture for receiving a single blade. In a particular implementation, the fabricating may be performed using a metal injection molding process.

In another embodiment, a razor apparatus may include a handle and a head pivotably mounted on the handle, where the head may include an aperture for receiving a single blade. The head may further include a means for retaining the single blade, where the means for retaining the single blade is configured to retain the single blade during use while permitting the single blade to move in two or more dimensions within the means for retaining the single blade during use.

In a particular implementation, the means for retaining the single blade may include a number of retaining posts, each configured to mate with a respective recess in the single blade to retain the single blade within the head. In a further implementation, the retaining posts may be spaced to retain the single blade during use while permitting the single blade to move in at least two dimensions during use.

In another embodiment, a method of manufacturing a razor apparatus may include fabricating a lower portion and an upper portion of a head, where the lower portion includes a number of retaining posts. The method may further include assembling the lower portion and the upper portion of the head. When assembled, the lower and upper portions of the head may form an aperture for receiving a single blade. Each of the retaining posts may be configured to mate with a respective recess in the single blade to retain the single blade within the head upon insertion of the single blade. Further, the retaining posts may be spaced to retain the single blade during use while permitting the single blade to move in at least two dimensions during use. In a particular implementation, the fabricating may be performed using a metal injection molding process.

BRIEF DESCRIPTION OF THE DRAWINGS

The above and further advantages of the methods and mechanisms may be better understood by referring to the following description in conjunction with the accompanying drawings, in which.

DETAILED DESCRIPTION OF EMBODIMENTS

Introduction and Terminology

Figure 1:
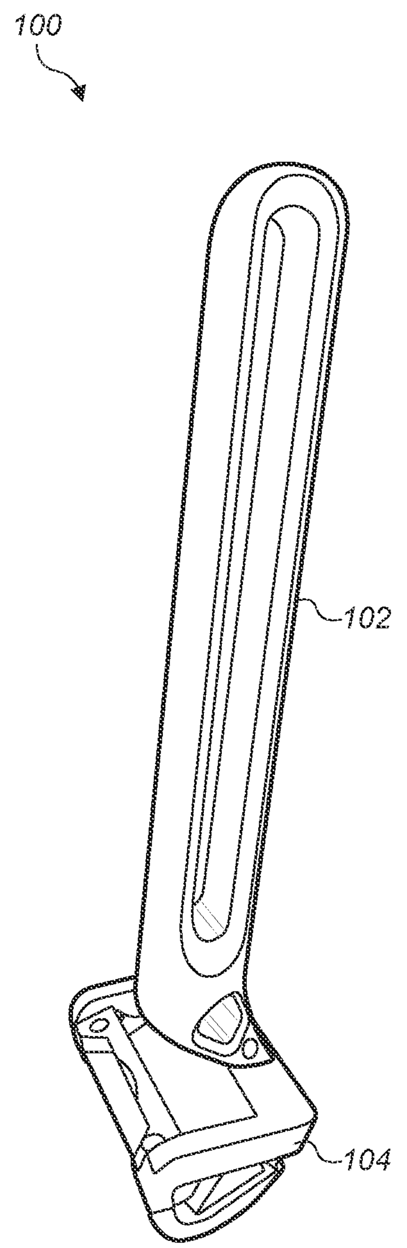
FIG. 1 illustrates an embodiment of a razor apparatus.

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described here. It will be appreciated that for simplicity and clarity of illustration, elements shown in the figures have not necessarily been drawn to scale. For example, the dimensions of some of the elements may be exaggerated relative to other elements.

This specification includes references to "an embodiment." The appearance of the phrase "in an embodiment" in different contexts does not necessarily refer to the same embodiment. Particular features, structures, or characteristics may be combined in any suitable manner consistent with this disclosure. Furthermore, as used throughout this application, the word "may" is used in a permissive sense (i.e., meaning "having the potential to"), rather than the mandatory sense (i.e., meaning "must"). Similarly, the words "include," "including," and "includes" mean including, but not limited to.

Terminology. The following paragraphs provide definitions and/or context for terms found in this disclosure (including the appended claims):

"Comprising." This term is open-ended. As used in the appended claims, this term does not foreclose additional structure or steps. Consider a claim that recites: "A system comprising a processor . . . " Such a claim does not foreclose the system from including additional components (e.g., a display, a memory controller).

"Configured To." Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit or mechanical apparatus). More specifically, this formulation is used to indicate that this structure is arranged to perform the one or more tasks during operation. A structure can be said to be "configured to" perform some task even if the structure is not currently being operated. A "temperature circuit configured to measure an internal operating temperature of a processing element" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible. Thus the "configured to" construct is not used herein to refer to a software construct such as an application programming interface (API).

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B. "Dependent on" may be employed as a synonym for "based on."

"In Response To." As used herein, this term is used to describe causality of events or conditions. For example, in the phrase "B occurs in response to A," there is a cause-and-effect relationship in which A causes B to occur. It is noted that this phrase does not entail that A is the only event that causes B to occur; B may also occur in response to other events or conditions that may be independent of or dependent on A. Moreover, this phrase does not foreclose the possibility that other events or conditions may also be required to cause B to occur. For example, in some instances, A alone may be sufficient to cause B to happen, whereas in other instances, A may be a necessary condition, but not a sufficient one (such as in the case that "B occurs in response to A and C").

"Each." With respect to a plurality or set of elements, the term "each" may be used to ascribe some characteristic to all the members of that plurality or set. But absent language to the contrary, use of "each" does not foreclose the possibility that other instances of the element might not include the characteristic. For example, in the phrase "a plurality of widgets, each of which exhibits property A," there must be at least two (and possibly arbitrarily many) widgets that exhibit property A. But without more, this does not foreclose the possibility of an additional widget, not a member of the plurality, that does not exhibit property A. In other words, absent language to the contrary, the term "each" does not refer to every possible instance of an element, but rather every element in a particular plurality or set.

Overview of Razor Apparatus and Head Support Structures

Figure 2:
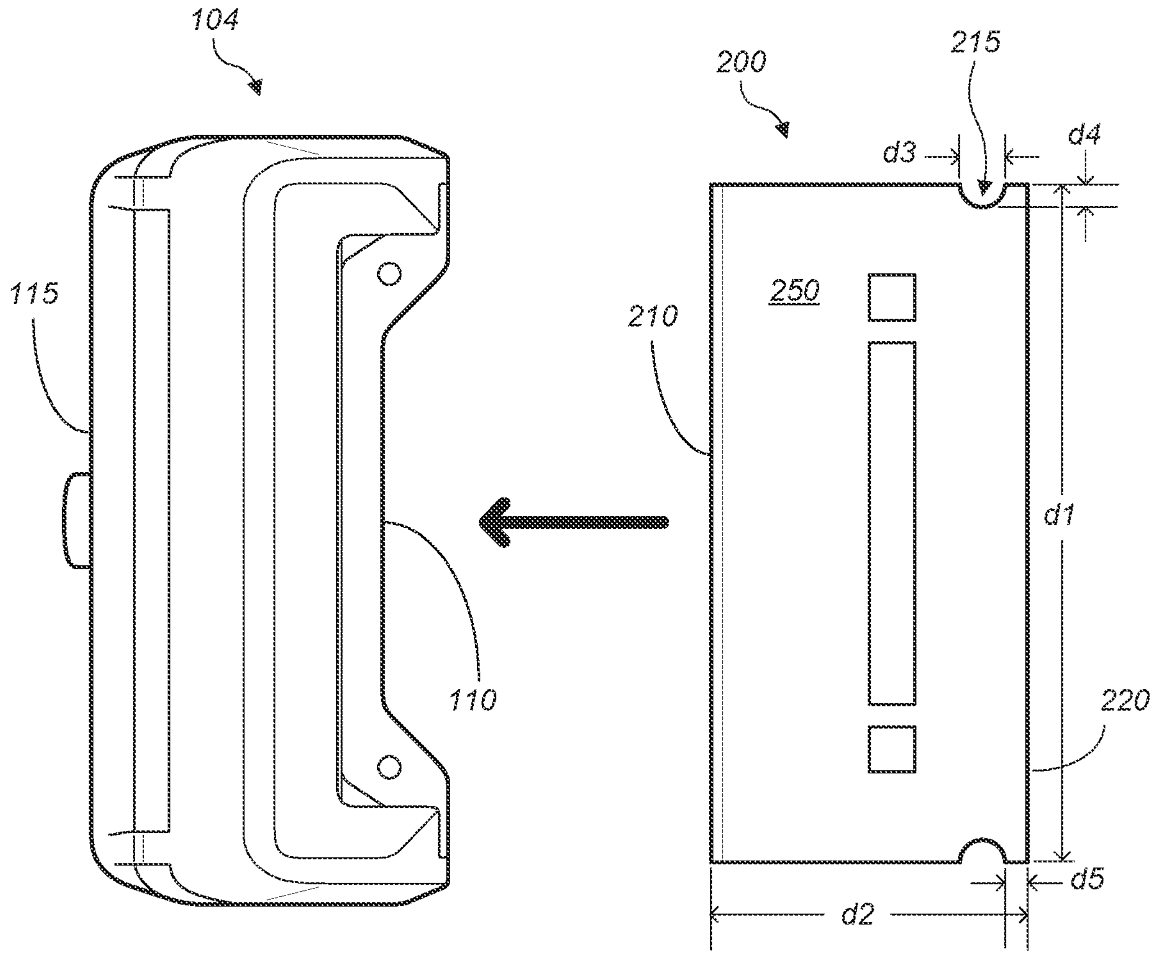
FIG. 2 illustrates a top view of a head of the razor apparatus of FIG. 1.

Turning now to FIG. 1, an embodiment of a razor apparatus is shown. (Preliminarily, it is noted that while the drawings attempt to faithfully reproduce details of actual embodiments, none of the drawings provided here should be interpreted as precise scale drawings.) Razor apparatus 100 includes a handle 102 and a head 104 pivotably attached to handle 102. FIG. 2 illustrates a top view of head 104. In the illustrated embodiment, head 104 includes a rear side 110 that includes an aperture (not labeled in FIG. 2) for receiving a single blade 200. When inserted into head 104, a cutting edge 210 of blade 200 may be exposed through a front side 115 of head 104, and a rear edge 220 of blade 200 may face the rear side 110. Blade 200 includes blade face 250, which may include cutouts or recesses that are not employed by head 104 (e.g., recesses for mounting blade 200 in other types of razors). In some embodiments, blade 200 may be inserted so that blade face 250 faces either up or down, while in other embodiments, blade 200 may specify a particular orientation for blade face 250.

In an embodiment, blade 200 may have a length (denoted d1) of about 38.4 mm, and a width (denoted d2) of about 18.4 mm. All measurements stated herein are subject to ordinary manufacturing tolerances for the process used to manufacture the item in question. For example, a sampling of a particular model of blades 200 yielded d1 in the range of 38.396 mm-38.437 mm, and d2 in the range of 18.360 mm-18.397 mm. Additionally, blade 200 may include a number of recesses 215 which, as will be described below, may mate with retaining posts of head 104 in order to retain blade 200 within head 104 during use. In the illustrated embodiment, recesses 215 are approximately semicircular in shape, and may measure about 4.0 mm (e.g., 3.985 mm-3.998 mm) along dimension d3 and about 1.84 mm (e.g., 1.831 mm-1.842 mm) along dimension d4. Recesses 215 may be located about 1.85 mm from the rear edge of blade 200 along dimension d5 (e.g., 1.827 mm-1.873 mm).

It is noted that in other embodiments of blade 200 and razor apparatus 100, these dimensions may vary. In particular, recesses 215 may assume shapes other than semicircular. Additionally, different embodiments of blade 200 may employ similar shapes and dimensions for recesses 215, but may vary the location of recesses 215 within blade 200 (e.g., by varying dimension d5). The relative positioning of recesses 215 may affect the relative degree of exposure of cutting edge 210 upon insertion of blade 200, which may in turn alter the shaving characteristics of razor apparatus 100.

Figure 3:
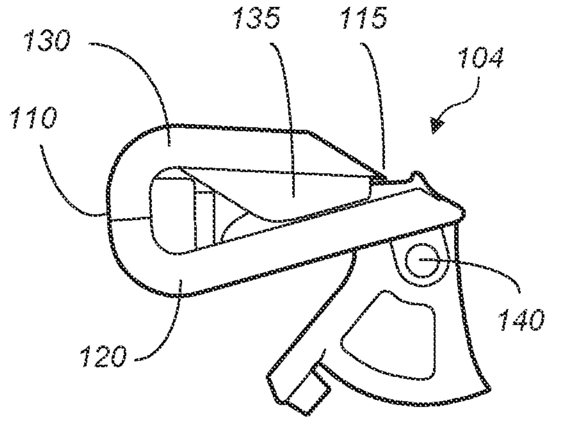
FIG. 3 illustrates a profile view of an embodiment of a razor head.

FIG. 3 illustrates a profile view of head 104. As shown, head 104 includes a lower portion 120 and an upper portion 130, as well as a pivot mount 140 through which head 104 may pivotably attach to handle 102. Upper portion 130 further includes a pair of side walls 135 (only one of which is shown in the view of FIG. 3) that form exterior side faces of head 104. In this view, rear side 110 of head 104 faces to the left, and front side 115 faces to the right.

In one design approach, the front region of upper portion 130 (i.e., the part of upper portion 130 that faces front side 115 of head 104) may effectively "float" over lower portion 120. That is, although the rear region of upper portion 130 may be attached to lower portion 120, the front region may extend over lower portion 120 without making physical contact with lower portion 120. In this approach, upper portion 130 may retain blade 200 from above, but there may be a gap between upper portion 130 and lower portion 120. Depending on the materials used to construct head 104, such a gap may affect the structural integrity of head 104. For example, without physical support, the front region of upper portion 130 may bend or break on impact, such as if razor apparatus 100 is dropped.

By contrast, in the embodiment of FIG. 3, lower portion 120 is designed to physically interface with upper portion 130 so that when head 104 is assembled, the front region of upper portion 130 is physically supported by lower portion 120. By permitting lower portion 120 and upper portion 130 to be secured to one another at multiple distinct points at both the front and rear regions of upper portion 130, the overall structural integrity of head 104 may be improved (e.g., with respect to impact).

Figure 4:
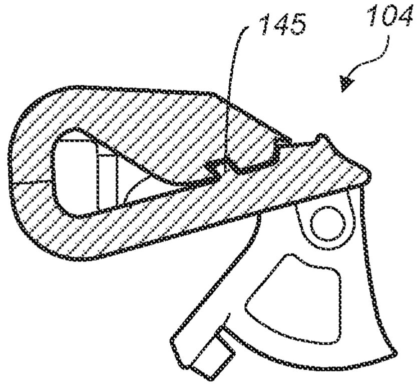
FIG. 4 is a cutaway view of the razor head profile view of FIG. 3 that shows certain internal structures of the head.

FIG. 4 illustrates an embodiment of a particular mechanism through which the front region of upper portion 130 may be physically supported by lower portion 120. The view of FIG. 4 is a cutaway view of FIG. 3 that shows an example of the internal structure of head 104 behind side wall 135. Specifically, FIG. 4 shows that the visible end of upper portion 130 physically rests on lower portion 120. Moreover, lower portion 120 includes a protruding feature 145, also referred to herein as a "latch," that mates with a corresponding recess within upper portion 130.

Figure 5:
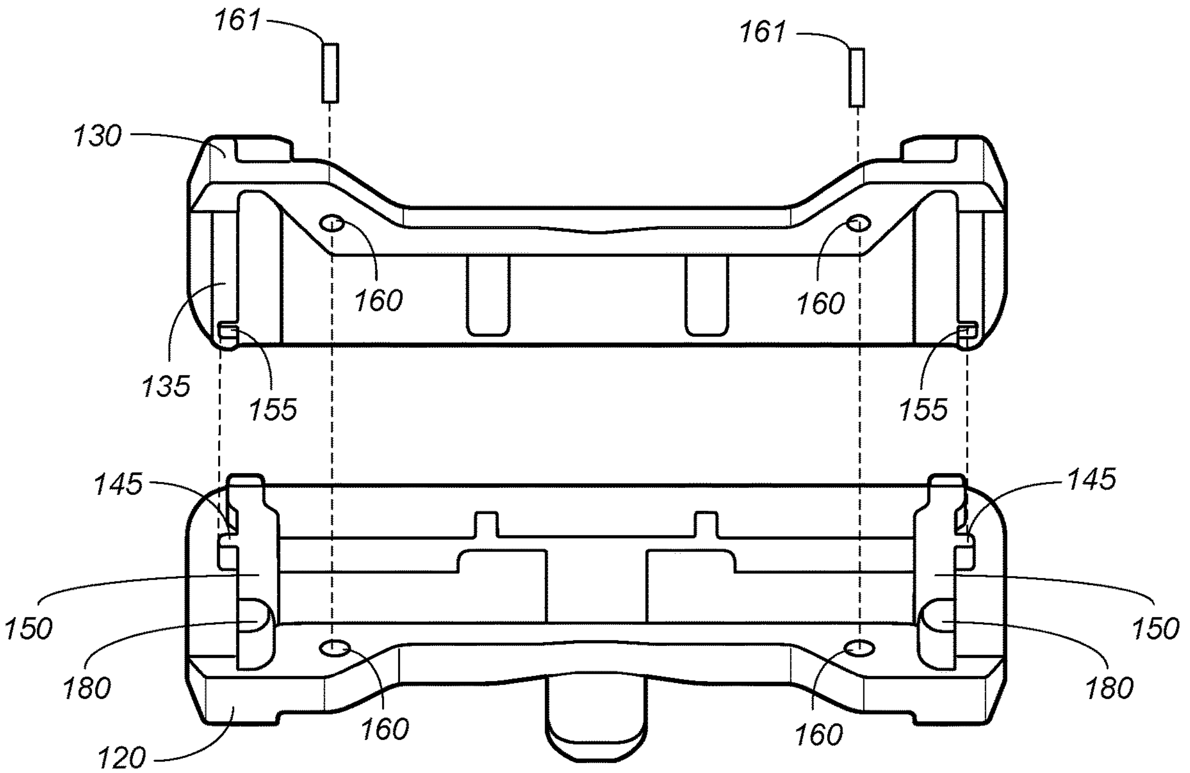
FIG. 5 presents a view of embodiments of a lower and upper portion of a razor head, oriented to show their internal surfaces.

Further details regarding latch 145 and other elements of head 104 are shown in FIG. 5. In the view presented by FIG. 5, lower portion 120 and upper portion 130 are separated and partially pivoted away from the viewer in order to illustrate their interior surfaces as viewed from rear side 110 of head 104. In the illustrated embodiment, lower portion 120 is shown to include latches 145 within side walls 150 at both ends, where the latches are proximate front side 115 of head 104 (e.g., closer to front side 115 than to rear side 110). Moreover, upper portion 130 is shown to include recesses 155 within both of its side walls 135. As illustrated by the dotted lines, latches 145 are configured to mate with recesses 155 (e.g., in a tongue-and-groove fashion) when lower portion 120 and upper portion 130 are assembled. Retaining posts 180, which may be configured to engage with recesses 215 of blade 200, are also shown, and will be discussed in greater detail with respect to later drawings.

As shown in FIG. 5, the rear regions of lower portion 120 and upper portion 130 also include mounting points 160. Mounting points 160 may be, for example, holes through which a screw, pin, or other type of fastener 161 may be inserted in order to fixedly secure lower portion 120 and upper portion 130 together. In some embodiments, mounting points 160 may correspond to spot welds or points of adhesion using a chemical adhesive. Moreover, in some embodiments, lower portion 120 may be secured to upper portion 130 along a continuous region (e.g., along a welded or adhered length) rather than at discrete points.

When the rear regions of lower portion 120 and upper portion 130 are secured at mounting points 160, the engagement of latches 145 with their corresponding recesses 155 may enable the front region of upper portion 130 to be securely attached to and physically supported by lower portion 120 through frictional engagement alone (e.g., without need for adhesives), although the attachment may be further enhanced with adhesives or welding if desired.

Latches 145 may be considered a means for physically supporting upper portion 130. However, it is noted that latches 145 need not be formed in lower portion 120. In an alternative embodiment, the orientation of latches 145 and recesses 155 may be reversed, such that latches 145 are formed within upper portion 130 and recesses 155 are formed within lower portion 120. This may (but need not) include relocating side walls 135 to lower portion 120. It is also noted that many equivalents to latches 145 exist. For example, recesses 155 may correspond to grooves within side walls 135 rather than notches, and latches 145 may correspondingly be relocated within side walls 150 to mate with such grooves. Generally speaking, latches 145 may encompass any type of protrusion in one portion of head 104 that is specifically formed to mate with a corresponding recess in the other portion of head 104 in order to physically support a front region of upper portion 130.

Figure 6:
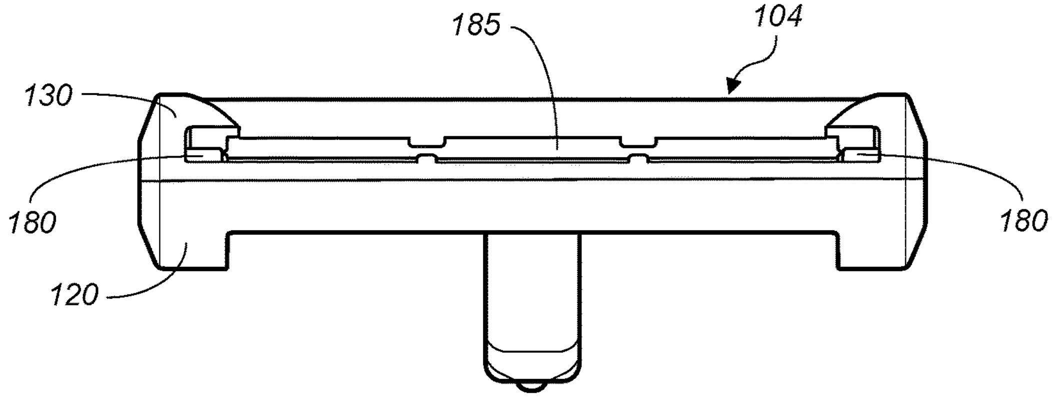
FIG. 6 illustrates a view of a razor head in which the lower and upper portions have been assembled together, as viewed from a rear side of the head.

FIG. 6 illustrates a view of head 104 in which lower portion 120 and upper portion 130 have been assembled together, as viewed from rear side 110 of head 104. It can be seen that lower portion 120 and upper portion 130 form an aperture 185 into which blade 200 may be inserted, as mentioned above with respect to FIG. 2. FIG. 6 further illustrates that retaining posts 180 protrude at least partially through upper portion 130 into aperture 185. In some embodiments, the exposure of retaining posts 180 above the surface of upper portion 130 may be 0.8 mm with a manufacturing tolerance of +/−0.05 mm.

Figure 7:
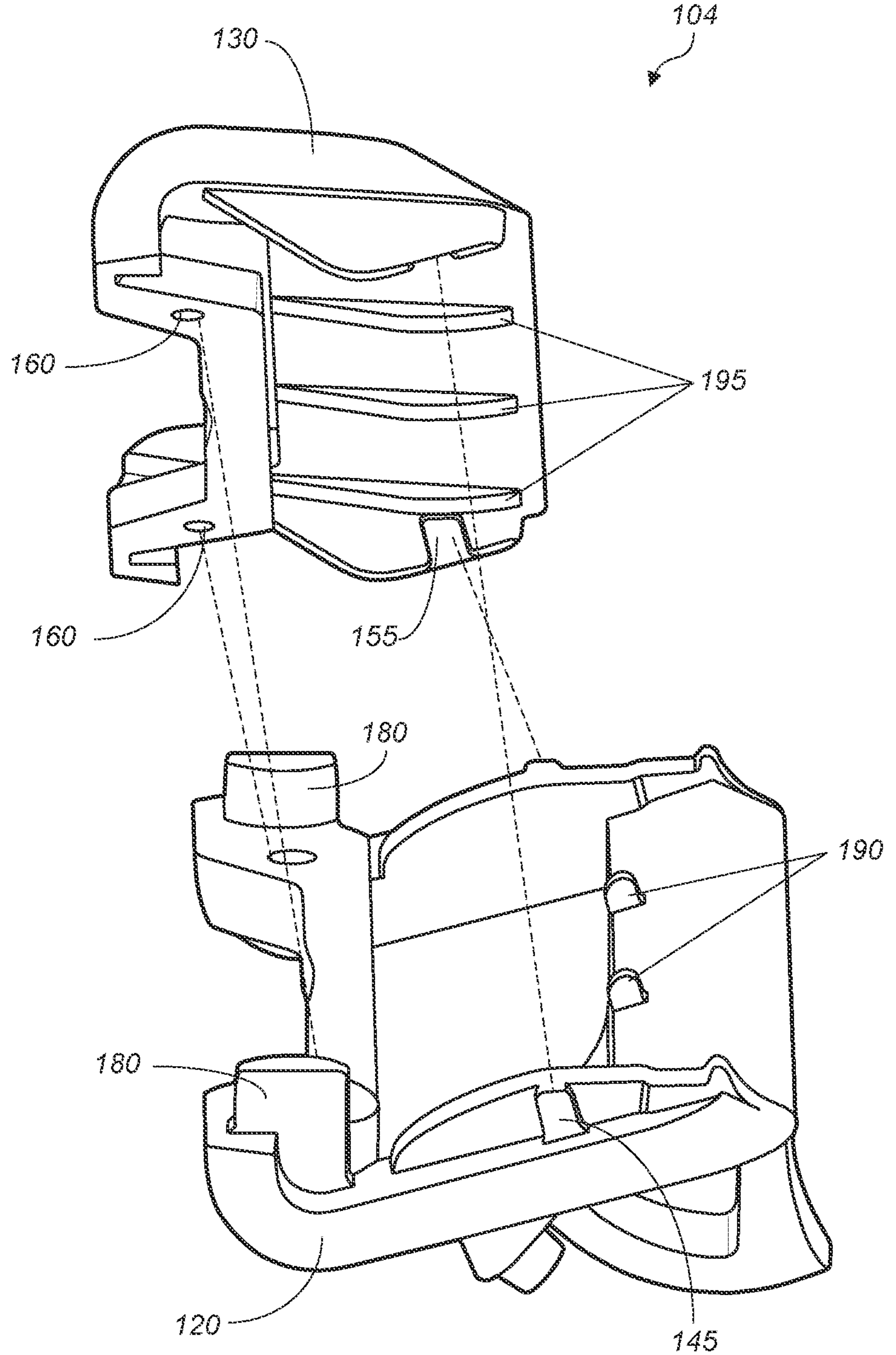
FIG. 7 shows an exploded view of an embodiment of a razor head in profile, further illustrating aspects of the lower and upper portions.

FIG. 7 illustrates an exploded view of head 104 in profile, in order to further illustrate the elements of head 104 and their interrelationship. For clarity of presentation, not every element appearing in FIG. 5 is labeled in FIG. 7. FIG. 7 does call out lower support elements 190 and upper support elements 195, which will be discussed in greater detail below.

Blade Movement Properties and Shaving Characteristics

Figure 8:
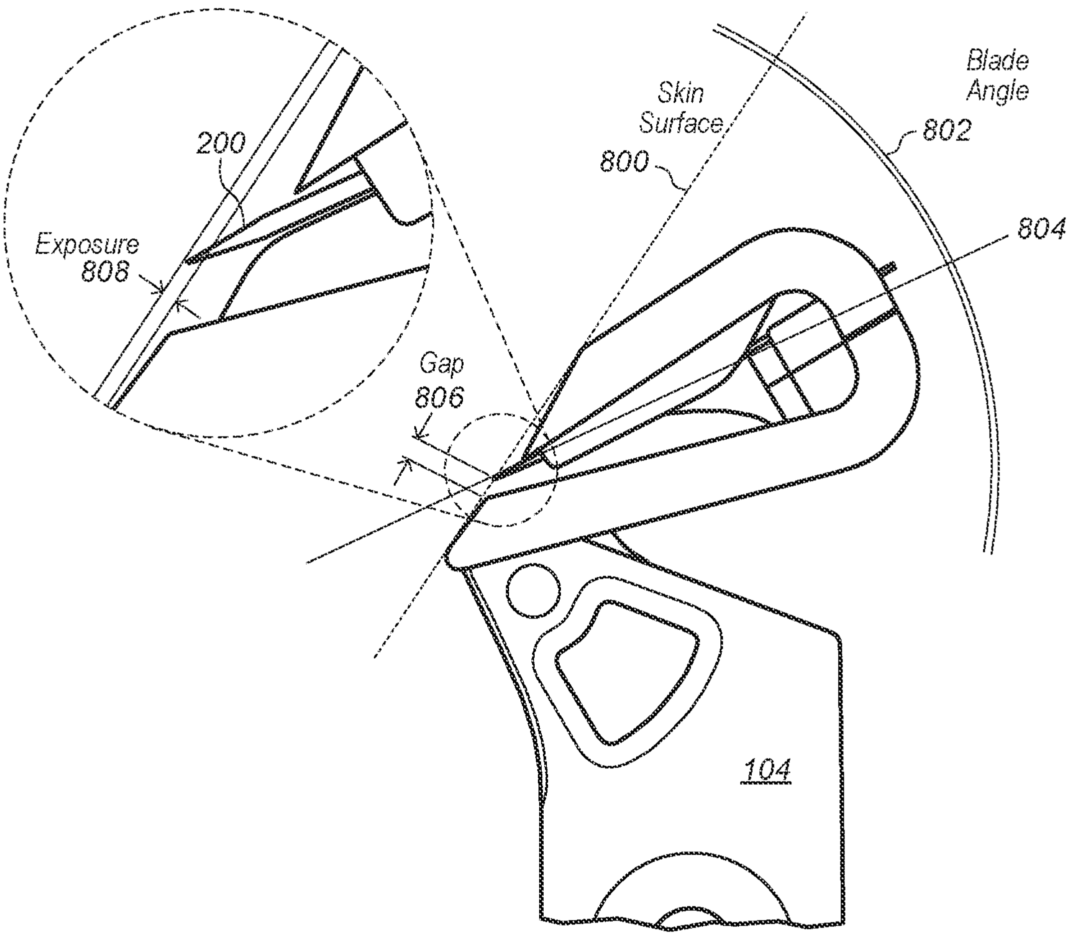
FIG. 8 is a schematic diagram illustrating an interaction between a razor apparatus and a skin surface, and illustrating several parameters that may characterize such interaction.

The shaving performance of a single blade razor such as razor apparatus 100 may be characterized as a function of several mechanical parameters. One such characterization is schematically illustrated in FIG. 8. Specifically, head 104 is shown interacting with a skin surface 800. Blade angle 802 is defined as the angle between skin surface 800 and a plane 804 in which blade 200 resides. Blade gap 806 is defined as the gap between cutting edge 210 of blade 200 and lower portion 120 of head 104. Blade exposure 808 (shown in the inset of FIG. 8) is defined as the depth to which blade 200 protrudes away from lower portion 120 and into skin surface 800.

Empirical measurements conducted using embodiments of razor apparatus 100 suggest that some combinations of the foregoing parameters may yield superior shaving performance (e.g., in terms of shave closeness, effort, comfort, and/or other characteristics) relative to others. One such combination includes a blade angle 802 of 31.3 degrees, a blade gap 806 of 0.65 mm, and a blade exposure 808 of 0.15 mm, although other combinations are possible and contemplated.

It is noted, however, that skin surface 800 is rarely uniform. Its topography may vary according to factors such as anatomical features and local skin imperfections (e.g., moles, blemishes, scars, warts, and the like). Accordingly, a configuration in which the parameters described above are statically maintained—e.g., by rigidly maintaining the position of blade 200 within head 104—may not perform as well as a configuration in which blade 200 is permitted at least a small degree of movement in various dimensions within head 104 during use.

Figure 9:
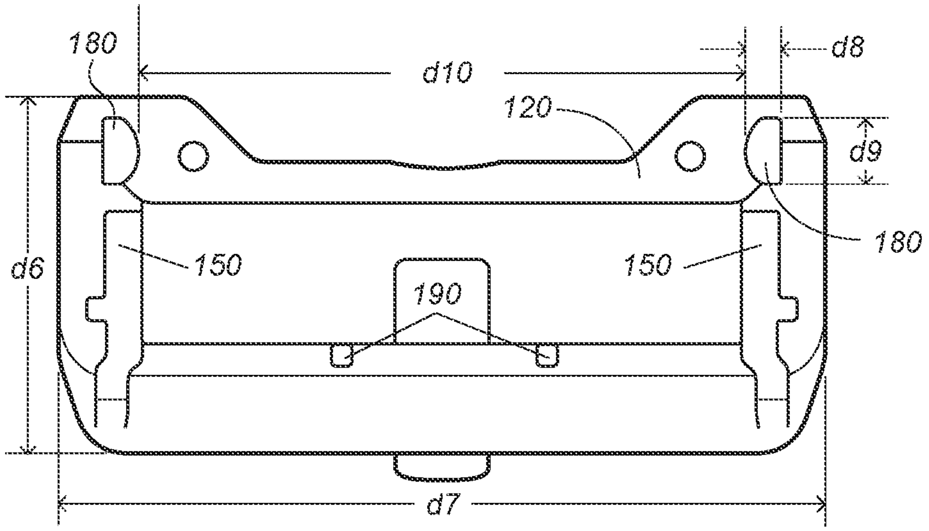
FIG. 9 illustrates an embodiment of a lower portion of a razor head that may be configured to permit blade movement in multiple dimensions during use.

FIG. 9 illustrates an embodiment of lower portion 120 that may be configured to permit such movement of blade 200. In particular, FIG. 9 illustrates a top view of the interior face of lower portion 120. Two retaining posts 180 are shown, as are side walls 150 and lower support elements 190. (Although latches 145 are visible in FIG. 9, they are not necessary to this embodiment and may be omitted.)

The properties of the illustrated embodiment of lower portion 120 that give rise to blade movement may be primarily determined by the spacing and dimensions of retaining posts 180. In the illustrated embodiment, lower portion 120 itself may have a width (denoted d6) of 20.5 mm with a manufacturing tolerance of +/−0.15 mm (represented as 20.5+/−0.15 mm), and a length (denoted d7) of 44.7+/−0.15 mm. Retaining posts 180 may have a dimension d8 of 2.0+/−0.05 mm and a dimension d9 of 3.95+/−0.05 mm. The spacing between retaining posts 180 (denoted d10) may be 35.0+/−0.15 mm.

It is noted that the foregoing dimensions and tolerances are merely examples and that other configurations are possible and contemplated. For example, various ones of the foregoing dimensions may be altered in order to adjust the blade movement characteristics discussed below. Further, the specified manufacturing tolerances may differ for different manufacturing processes. Additionally, it is noted that the number and shape of retaining posts 180 may vary in different embodiments. It is not strictly necessary that the general shape of retaining posts 180 match that of recesses 215. That is, it may be possible to achieve the results described here with a shape of retaining posts 180 that provides fewer points of contact between retaining posts 180 and recesses 215 than the semicircular shape shown.

Figure 10:
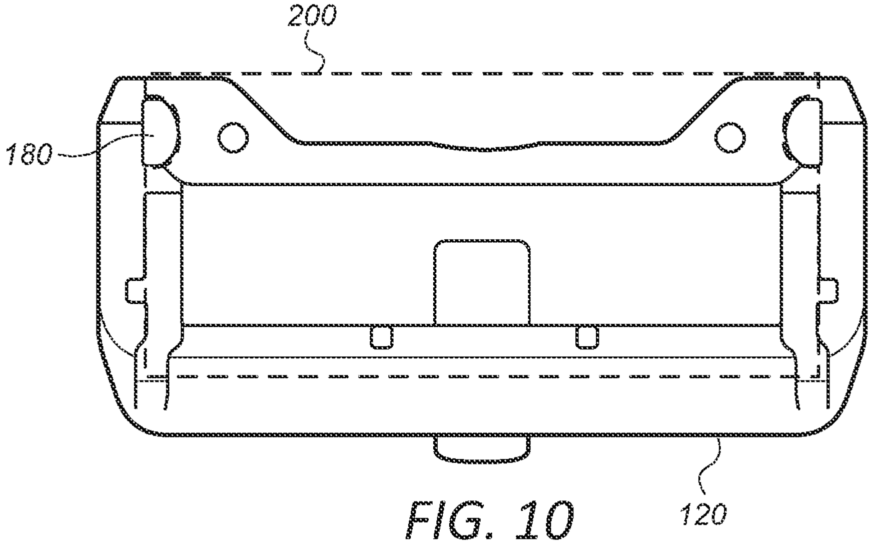
FIG. 10 corresponds to the view of the lower portion of FIG. 9 with a single blade inserted.
Figure 11:
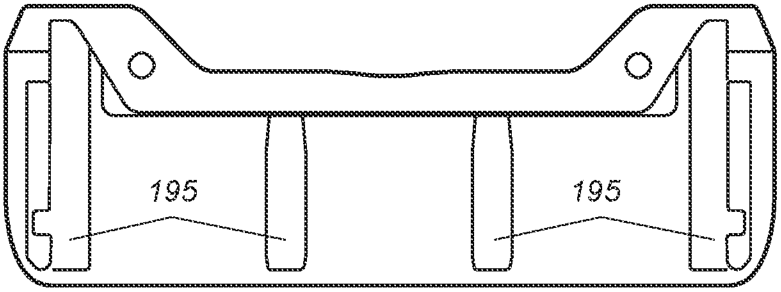
FIG. 11 illustrates an embodiment of an upper portion of a razor head that may be configured to support a single blade from above.
Figure 12:
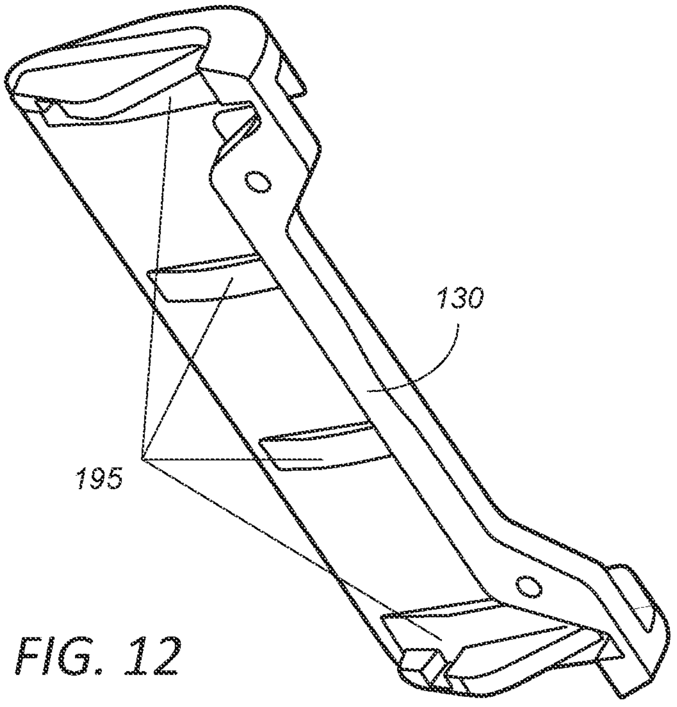
FIGS. 12-13 present additional views of the upper and lower portions shown in FIGS. 9-11.
Figure 13:
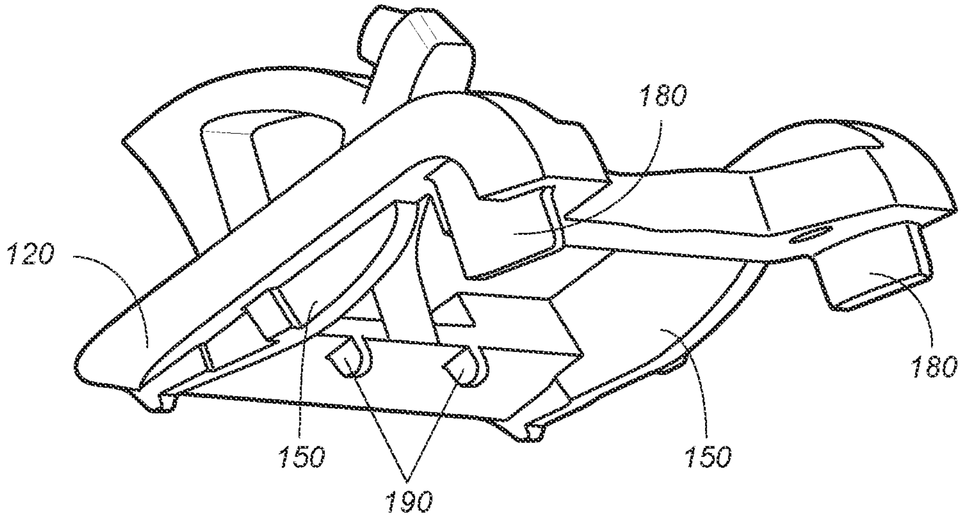

FIG. 10 corresponds to the view of lower portion 120 shown in FIG. 9 with blade 200 inserted. As shown in FIG. 10, recesses 215 of blade 200 mate respectively with retaining posts 180, which will retain blade 200 within head 104 during use. Additionally, blade 200 is supported from below by lower support elements 190 and side walls 150. With reference to FIG. 11, which illustrates a top view of the interior face of upper portion 130, blade 200 is also supported from above by upper support elements 195. (The number and arrangement of blade support points within lower portion 120 and upper portion 130 may vary in various embodiments.) Generally speaking, the dimensions of lower support elements 190 and upper support elements 195 will vary depending on the vertical depths of lower portion 120 and upper portion 130. These support elements should generally be sized so that they contact blade 200 and permit blade 200 to pivot around the contact point, without fitting so tightly that blade 200 cannot otherwise move within head 104. For completeness, additional views of upper portion 130 and lower portion 120 are shown in FIGS. 12-13, which illustrate these components from different angles.

As can be seen by comparing the dimensions and spacing of retaining posts 180 with the corresponding dimensions of blade 200 discussed above, retaining posts 180 are slightly smaller in diameter than recesses 215 of blade 200 (e.g., d9 of about 3.95 mm for retaining posts 180 versus d3 of about 4.0 mm for recesses 215). Additionally, the effective spacing between recesses 215 is about 34.7 mm (e.g., d1 of about 38.4 mm-2*d3 of about 1.84 mm), whereas the spacing of retaining posts 180 is slightly wider (e.g., d10 of about 35.0 mm).

Accordingly, the relative dimensions and spacing of retaining posts 180 in conjunction with recesses 215 of blade 200 may permit movement of blade 200 in multiple (e.g., at least two) dimensions during use. These additional degrees of movement may enable the position of blade 200 to more readily adapt to non-uniformities in skin surface 800 than a rigidly retained blade, which may in turn improve shaving performance. Through empirical testing of some embodiments of razor apparatus 100, improved performance may result when blade 200 is permitted to move along a dimension parallel to cutting edge 210 of blade 200 (e.g., dimension d1 of FIG. 2) in the range of 0.175-0.30 mm, with a possible optimum value within this range of 0.225 mm.

Similarly, improved performance may result when blade 200 is permitted to move along a dimension perpendicular to cutting edge 210 of blade 200 (e.g., dimension d2 of FIG. 2) in the range of 0.20-0.45 mm, with a possible optimum value within this range of 0.30 mm.

As noted above, blade 200 may tend to pivot around the support points presented by lower support elements 190 and upper support elements 195. That is, in addition to movement within the plane of blade 200, blade 200 may also move in a direction perpendicular to this plane (e.g., perpendicular to face 250). For example, cutting edge 210 may be permitted to move along a dimension perpendicular to face 250 by 0.15-0.375 mm, with a possible optimum value within this range of 0.25 mm. Likewise, rear edge 220 may be permitted to move along a dimension perpendicular to face 250 by 0.45-1.0 mm, with a possible optimum value within this range of 0.85 mm.

It is noted that the foregoing ranges are merely examples, and that other suitable ranges may be determined for different configurations of blade 200 and head 104.

Materials and Fabrication

Generally speaking, the components of razor apparatus 100 may be manufactured according to any suitable method from any suitable material. In some embodiments, various elements of razor apparatus 100 (e.g., lower portion 120 and upper portion 130, but possibly including all elements) may be fabricated using a metal injection molding (MIM) process. In MIM, a powdered metal feedstock containing a binder may be injected into a mold in a manner similar to plastic injection molding (and possibly using the same equipment). Once the binder solidifies, the resulting "green" part may be further processed in one or more steps to remove the binder and densify the metal particles, often involving sintering the part in a high-heat environment (possibly high enough to partially melt the metal).

The finished MIM product may undergo other types of metal processing, such as plating, hardening, annealing, etc., similar to metalwork produced via machining, casting, forging or other conventional processes, and the resulting part may possess similar physical characteristics to parts produced using such conventional processes. Some machining steps may be necessary or desired before final assembly. (A typical manufacturing tolerance for a MIM may be +/−0.5% of the length in any direction, although tighter tolerances may be achieved through process refinements or post-MIM processing steps such as machining.) However, the MIM process may enable much faster manufacturing of complex metal parts than if such parts were machined from solid metal. That said, the components of razor apparatus 100 may also be fabricated using machining from a solid metal workpiece, liquid metal casting, or any other suitable technique.

If MIM is chosen, any suitable feedstock may be employed. A stainless steel powder feedstock may be preferable, given that razor apparatus 100 would routinely be exposed to moisture during use. One possible feedstock choice would be 316L stainless steel, which may have a post-sintering composition by weight of: ≤0.03% carbon, 16.0-18.0% chromium, 10.0-14.0% nickel, 2.0-3.0% molybdenum, ≤2.0% manganese, ≤1.0% silicon, balance iron.

Alternatively, a substantially nickel-free stainless steel powder feedstock may be employed. One example of such a feedstock is BASF™ Catamold™ PANACEA, which may have a post-sintering composition by weight of: ≤0.2% carbon, 0.75-0.90% nitrogen, 16.5-17.5% chromium, ≤0.1% nickel, 3.0-3.5% molybdenum, 10.0-12.0% manganese, ≤1.0% silicon, balance iron. The use of PANACEA, heretofore unknown to the inventors in the context of manufacturing a razor apparatus, may present several advantages over other types of stainless steel. For example, PANACEA may provide increased resistance to bending or breakage upon impact (e.g., in the event that razor apparatus 100 is dropped). Moreover, given that head 104 is designed for extensive skin contact, the substantially nickel-free composition of PANACEA may be beneficial for those with nickel allergies. It is noted that in some embodiments, the components of head 104 may be fabricated using one type of material, whereas other components of razor apparatus 100 may be fabricated using a different material.

Figure 14:
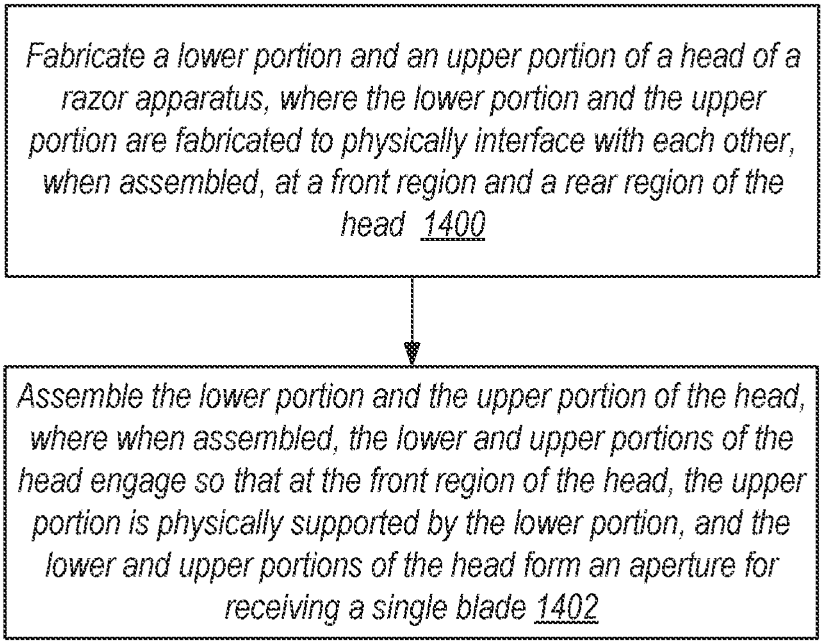
FIG. 14 is a flow chart illustrating an embodiment of a method of manufacturing a razor apparatus.

FIG. 14 is a flow chart illustrating an embodiment of a method of manufacturing a razor apparatus. Operation begins in block 1400 with fabricating a lower portion and an upper portion of a head of a razor apparatus. Specifically, the lower portion and upper portion are fabricated to physically interface with each other, when assembled, at a front region and a rear region of the head. For example, the method may include fabricating lower portion 120 and upper portion 130 configured as described above, according to a MIM process, machining, or any other suitable fabrication process.

Operation continues in block 1402 with assembling the lower portion and the upper portion of the head. When assembled, the lower and upper portions of the head engage so that at the front region of the head, the upper portion is physically supported by the lower portion, and the lower and upper portions of the head form an aperture for receiving a single blade. For example, lower portion 120 and upper portion 130 may be assembled as shown in the preceding figures according to the discussion above.

Figure 15:
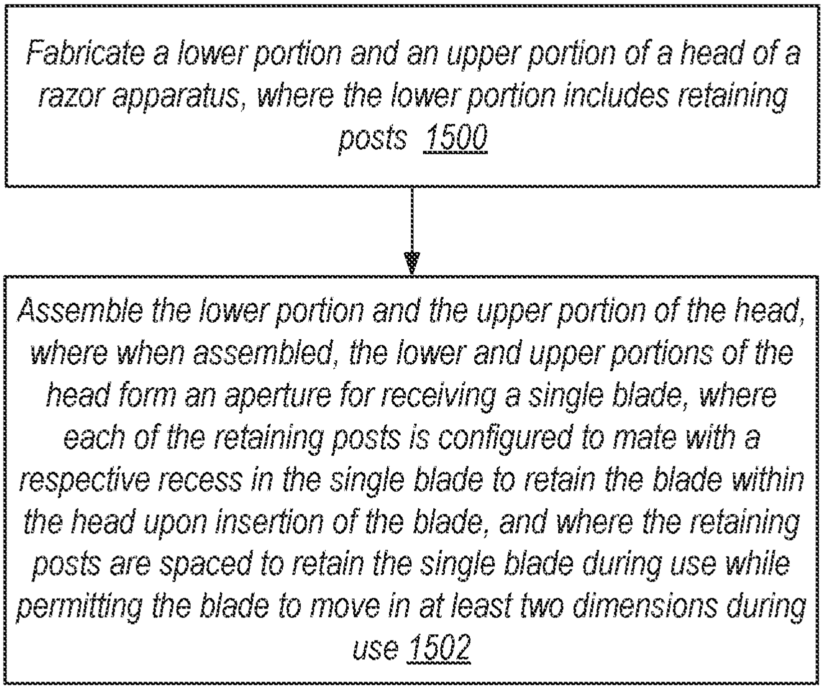
FIG. 15 is a flow chart illustrating a different embodiment of a method of manufacturing a razor apparatus.

FIG. 15 is a flow chart illustrating another embodiment of a method of manufacturing a razor apparatus. Operation begins in block 1500 with fabricating a lower portion and an upper portion of a head of a razor apparatus, where the lower portion includes a number of retaining posts. For example, lower portion 120 may include retaining posts 180 as described in detail above. As with the previously described method, this method may include fabricating lower portion 120 and upper portion 130 according to a MIM process, machining, or any other suitable fabrication process.

Operation continues in block 1502 with assembling the lower portion and the upper portion of the head. When assembled, the lower and upper portions of the head form an aperture for receiving a single blade. Moreover, each of the retaining posts is configured to mate with a respective recess in the single blade to retain the single blade within the head upon insertion of the single blade. Further, the retaining posts are spaced to retain the single blade during use while permitting the single blade to move in at least two dimensions during use. For example, lower portion 120 and upper portion 130 may be assembled to permit a small degree of movement of blade 200 as discussed above with respect to FIGS. 8-12.

Although the discussion above has been presented with respect to a single instance of razor apparatus 100 in order to facilitate discussion, it is noted that any of the features described above—specifically including the use of latches 145 and the configuration of retaining posts 180—may be used together or separately.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A razor apparatus, comprising:

a handle; and a head mounted on the handle, wherein the head includes an upper portion and a lower portion that, when coupled together, are configured to have a single blade positioned between the upper portion and the lower portion, wherein with a cutting edge of the single blade is exposed through a front side of the head when the single blade is inserted from at least a portion of a rear side of the head and positioned inside the head between the upper portion and the lower portion, the cutting edge being exposed beyond a longitudinal side of the upper portion at the front side of the head, and wherein, when the upper portion and the lower portion are coupled together, at least part of a rear region of the upper portion is in contact with part of a rear region of the lower portion;

wherein the head includes a plurality of retaining posts on the lower portion of the head, at least two of the retaining posts contacting one or more points of contact on opposing sides of the single blade when the single blade is positioned inside the head, wherein the single blade is retained inside the head, at least in part, by the points of contact on the single blade being in contact with the at least two retaining posts, and wherein the at least two retaining posts allow only an entirety of the single blade to move, when the cutting edge is configured to contact a skin surface during shaving, in a direction perpendicular to the cutting edge of the single blade and in a direction laterally along the cutting edge when the single blade is positioned inside the head.

2. The razor apparatus of claim 1, wherein the at least two retaining posts mate with respective recesses in the portions of the single blade when the single blade is positioned inside the head.

3. The razor apparatus of claim 2, wherein the at least two retaining posts have a smaller outside diameter than an inside diameter of the respective recesses.

4. The razor apparatus of claim 1, wherein the cutting edge of the single blade is exposed through the front side of the head between the upper portion and the lower portion.

5. The razor apparatus of claim 1, wherein the upper portion includes a pair of side walls that form an exterior of the head when the upper portion is coupled to the lower portion.

6. The razor apparatus of claim 1, wherein the single blade is positioned between the at least two retaining posts when the single blade is positioned inside the head.

7. The razor apparatus of claim 1, wherein the lower portion of the head includes one or more support elements that support the single blade when the single blade is positioned inside the head.

8. The razor apparatus of claim 1, wherein the upper portion of the head includes one or more support elements that support the single blade when the single blade is positioned inside the head.

9. The razor apparatus of claim 1, wherein the at least two retaining posts permit the single blade to freely move in the direction perpendicular to the cutting edge of the single blade without biasing forces.

10. The razor apparatus of claim 1, wherein the lower portion is closer to the handle than the upper portion.

11. The razor apparatus of claim 1, wherein the at least two retaining posts are positioned on opposing sides of the lower portion.

12. The razor apparatus of claim 1, wherein the head is pivotably mounted on the handle such that both the upper portion and the lower portion pivot with respect to the handle.

13. A razor apparatus, comprising:

a handle;

a head mounted on the handle, the head being adapted to operate with a single blade, wherein the head includes:

an upper portion;

a lower portion;

wherein, when the upper portion and the lower portion are coupled together, the head is configured to have the single blade positioned between the upper portion and the lower portion, wherein a cutting edge of the single blade is exposed through a front side of the head when the single blade is inserted from at least a portion of a rear side of the head and positioned inside the head between the upper portion and the lower portion, the cutting edge being exposed beyond a longitudinal side of the upper portion at the front side of the head, and wherein, when the upper portion and the lower portion are coupled together, at least part of a rear region of the upper portion is in contact with part of a rear region of the lower portion at the rear side of the head; and at least two retaining posts on the lower portion of the head, wherein the single blade is positioned between the at least two retaining posts such that the single blade is retained in the head, at least in part, by the at least two retaining posts being in contact with portions of the single blade on opposing sides of the single blade when the single blade is positioned inside the head, wherein the portions of the single blade being in contact with the at least two retaining posts allows only an entirety of the single blade to move, when the cutting edge is configured to contact a skin surface during shaving, in a direction perpendicular to the cutting edge of the single blade and in a direction laterally along the cutting edge when the single blade is positioned inside the head.

14. The razor apparatus of claim 13, wherein the at least two retaining posts mate with respective recesses in the portions of the single blade when the single blade is positioned inside the head.

15. The razor apparatus of claim 13, wherein the cutting edge of the single blade is exposed through the front side of the head between the upper portion and the lower portion.

16. The razor apparatus of claim 13, wherein the upper portion includes a pair of side walls that form an exterior of the head when the upper portion is coupled to the lower portion.

17. The razor apparatus of claim 13, wherein the single blade is positioned between the at least two retaining posts when the single blade is positioned inside the head.

18. The razor apparatus of claim 13, wherein the head is pivotably mounted on the handle such that both the upper portion and the lower portion pivot with respect to the handle.

19. A razor system, comprising:

a handle;

a head mounted on the handle; and a single blade having a cutting edge along only one side of the single blade and recesses on opposing sides of the single blade along the cutting edge;

wherein the head includes an upper portion and a lower portion that, when coupled together, are configured to have the single blade positioned between the upper portion and the lower portion, wherein the cutting edge of the single blade is exposed through a front side of the head when the single blade is inserted from at least a portion of a rear side of the head and positioned inside the head between the upper portion and the lower portion, the cutting edge being exposed beyond a longitudinal side of the upper portion at the front side of the head, and wherein, when the upper portion and the lower portion are coupled together, at least part of a rear region of the upper portion is attached to and in contact with part of a rear region of the lower portion;

wherein the head includes a plurality of retaining posts on the lower portion of the head, at least two of the retaining posts being configured to engage with the recesses on the opposing sides of the single blade when the single blade is positioned inside the head to retain the single blade inside the head, and wherein the at least two retaining posts allow only an entirety of the single blade to move, when the cutting edge is configured to contact a skin surface during shaving, in a direction perpendicular to the cutting edge of the single blade and in a direction laterally along the cutting edge when the single blade is positioned inside the head.

20. The razor system of claim 19, wherein the at least two retaining posts contact the recesses on opposing sides of the single blade when the single blade is positioned inside the head.

* * * * *